(12) United States Patent
Tsai

(10) Patent No.: US 7,325,959 B2
(45) Date of Patent: Feb. 5, 2008

(54) LIGHT GUIDE PLATE

(75) Inventor: Kun-Jung Tsai, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 96 days.

(21) Appl. No.: 11/306,457

(22) Filed: Dec. 29, 2005

(65) Prior Publication Data

US 2006/0198163 A1  Sep. 7, 2006

(30) Foreign Application Priority Data

Jan. 20, 2005  (CN)  .................. 2005100329429

(51) Int. Cl.
*G02B 6/00*  (2006.01)
(52) U.S. Cl. .............. 362/625; 362/615; 362/627; 362/626; 362/623
(58) Field of Classification Search ........ 362/623–626, 362/617–620
See application file for complete search history.

(56) References Cited

U.S. PATENT DOCUMENTS

| 5,363,294 | A | 11/1994 | Yamamoto et al. | |
|---|---|---|---|---|
| 6,752,505 | B2 * | 6/2004 | Parker et al. | 362/627 |
| 7,039,286 | B2 * | 5/2006 | Leu et al. | 385/129 |
| 2007/0103938 | A1 * | 5/2007 | Chang et al. | 362/617 |

FOREIGN PATENT DOCUMENTS

| CN | 2588387 Y | 11/2003 |
|---|---|---|
| CN | 1567050 A | 1/2005 |

* cited by examiner

*Primary Examiner*—Jong-Suk (James) Lee
*Assistant Examiner*—Robert May
(74) *Attorney, Agent, or Firm*—Winston Hsu

(57) ABSTRACT

A light guide plate includes an incidence surface, an emission surface, a bottom surface opposite to the emission surface, and a plurality of dots distributed on the bottom surface. The emission surface and the bottom surface are adjoining to the incidence surface. Each of the dots has a substantially fan-shaped cross-section in the direction of the bottom surface.

20 Claims, 7 Drawing Sheets

LIGHT GUIDE PLATE

FIELD OF THE INVENTION

The invention relates generally to light guide plates used in back light systems of liquid crystal display devices and, more particularly, to a light guide plate having a plurality of dots arranged on a bottom surface thereof.

DESCRIPTION OF RELATED ART

Back light systems are used in liquid crystal display devices for converting linear light sources, such as cold cathode ray tubes, or point light sources, such as light emitting diodes, into area light sources having high uniformity and brightness.

A conventional back light system includes a light source, a light guide plate, a reflection plate, a diffusion plate and a prism sheet. The light source can be located beside one end or beside two opposite ends of the light guide plate and is used to emit incident light beams into the light guide plate. The light guide plate is used to lead/guide travel of the incident light beams therein and ensure that most of the incident light beams can be emitted from an emission surface thereof. The reflection plate is located below a bottom surface of the light guide plate and is used to reflect some of the incident light beams that are emitted from the bottom surface into the light guide plate. This reflection enhances the utilization ratio of the incident light beams. The diffusion plate and the prism sheet are located on the emission surface of the light guide plate, in turn, and are used to improve uniformity of the emitted light beams.

As shown in FIG. 4, a conventional surface light source device includes a light guide plate 1, a line light source 2, an end edge reflection layer 4, a light diffusion layer 6, a white back-face reflection layer 5, and a curved reflection plate 7. The line light source 2 is positioned on and/or adjacent a first end edge of the light guide plate 1. The end edge reflection layer 4 is provided on and/or adjacent a second end edge of the light guide plate 1, and the light diffusion layer 6 is provided on and/or adjacent a light emitting surface of the light guide plate 1. The white back-face reflection layer 5 is provided on a back surface of the light guide plate 1. The curved reflection plate 7 is further provided to enclose the line light source 2 so as to effectively utilize light beams emitted by the line light source 2.

Furthermore, a light diffusion/transmission section 3 is provided on the back surface of the light guide plate 1. The light diffusion/transmission section 3 is formed by means, for example, of gravure printing, offset printing, and/or screen printing or transfer and, as formed, includes a plurality of dots. The dots can have arbitrary shapes such as round, square or chain dot-shapes and are used to break up what would otherwise be a total reflection condition of the incident light beams. The provision of such dots ensures that most of the light beams can pass through the light-emitting surface of the light guide plate 1.

Referring to FIG. 5, a distribution of the dots on the back surface of the light guide 1 is shown. In a region from the first end edge of the light guide plate 1 to a position at which the surface emission luminance of the light guide plate 1 is lowest, the ratio of dot area of the light diffusion/transmission section 3 to the whole area of the back surface of the light guide plate 1 gradually increases with an increase in distance from the first end edge along a first direction. The first direction is perpendicular to the end edges of the light guide plate 1 and is parallel to the side edges of the light guide plate 1. In a region from the position at which the surface emission luminance of the light guide plate 1 is lowest to the second end edge of the light guide plate 1, the ratio is constant along the first direction. The ratio of the dot area of the light diffusion/transmission section 3 to the whole area of the back surface of the light guide plate 1 is made constant along a second direction perpendicular to the first direction.

The light diffusion/transmission section 3 can enhance, to a certain extent, the uniformity of the emitted light beams from the light guide plate 1. However, two corners of the first end edge of the light guide plate 1 are electroshock areas of the line light source 2, and the brightness of the emitted light beams at the two corners is relatively low. Furthermore, a clearance between adjacent dots of the light diffusion/transmission section 3 is relatively big. That is to say, the distribution density of the dots is relatively small, and, as such, the light diffusion/transmission section 3 can't disperse light beams as effectively as would be desired. Thus, it is difficult to achieve entire uniformity of the emitted light beams from the whole area of the light guide plate 1.

Furthermore, clearances between adjacent columns of dots are straight and tend to produce bright lines in use. Thus, the light guide plate 1 can't provide optimal display quality.

What is needed, therefore, is a light guide plate that can provide emission of light beams with good uniformity.

What is also needed is a light guide plate that can provide an improved display quality.

SUMMARY OF INVENTION

In one embodiment, a light guide plate includes: an incidence surface, an emission surface, a bottom surface opposite to the emission surface, and a plurality of dots distributed on the bottom surface. The emission surface and the bottom surface are adjoining to the incidence surface. Each of the dots has a substantially fan-shaped cross-section in the direction of the bottom surface. A distribution density of the dots progressively increases along a direction away from a light source. The distribution density of the dots near the light source is smaller than the dots far from the light source. An angle subtended by the cross-sectional sector (hereinafter, sector angle) of each of the dots progressively increases along a direction away from the light source. The sector angle of each of the dots near the light source is smaller than that of the each of the dots far from the light source. The cross-sectional area of each of the dots near the light source is smaller than that of each of the dots far from the light source.

DETAILED DESCRIPTION

Figure 1:
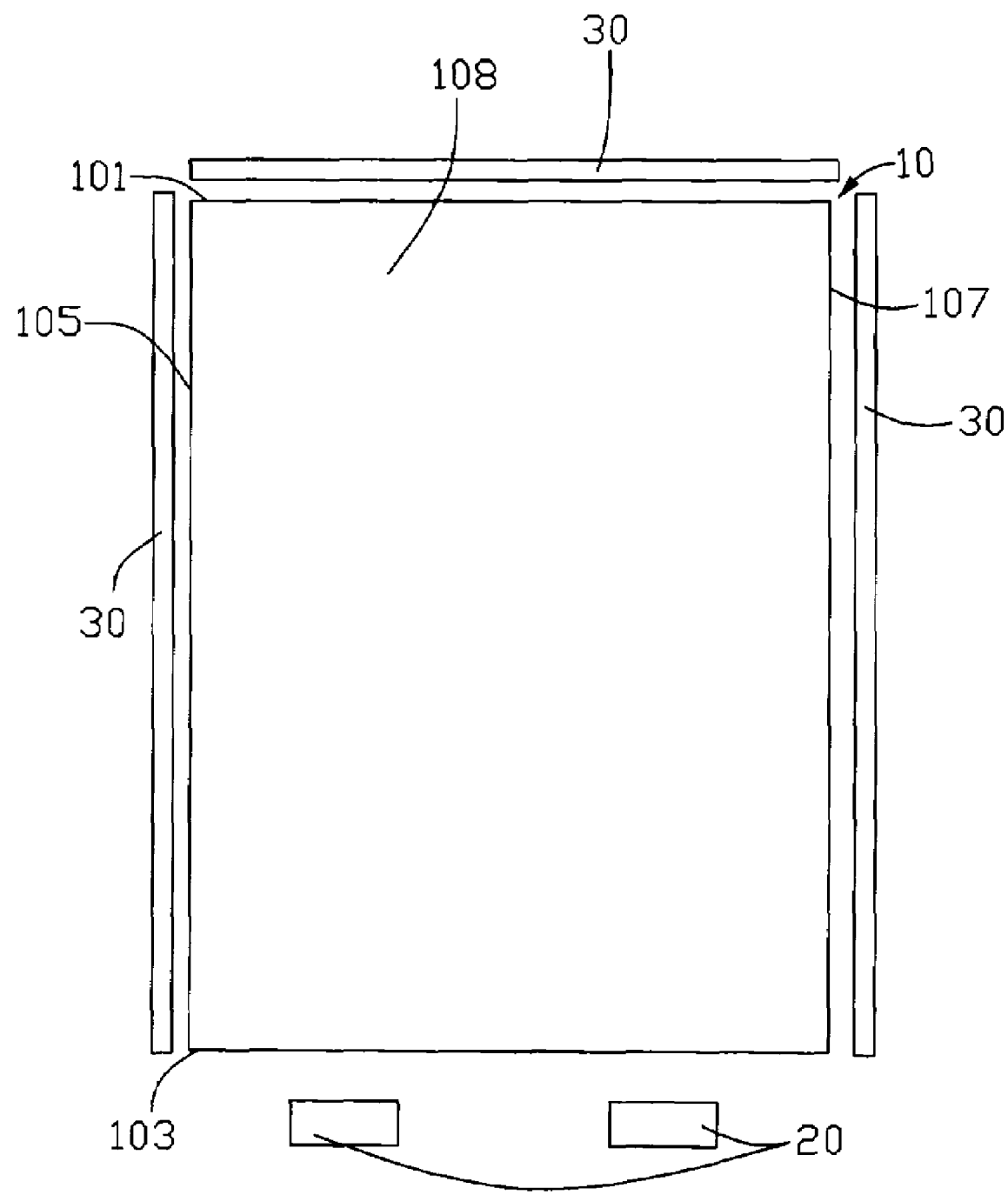
FIG. 1 is a schematic, top view of a light guide plate in accordance with a preferred embodiment of the present device, the light guide plate cooperating with a light source.
Figure 2:
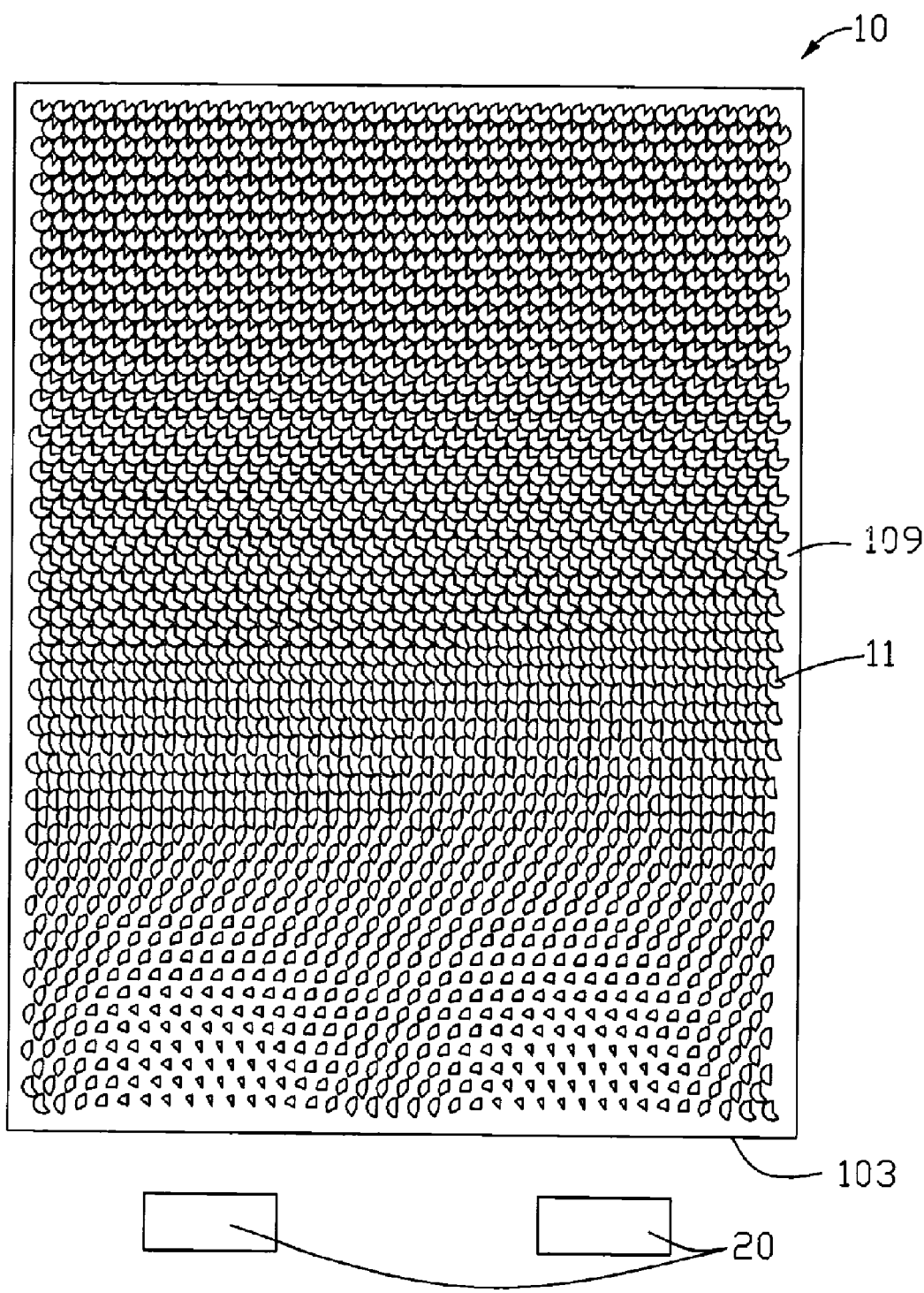
FIG. 2 is a schematic, bottom view of the light guide plate of FIG. 1, showing a plurality of dots distributed on a bottom surface thereof.
Figure 2A:
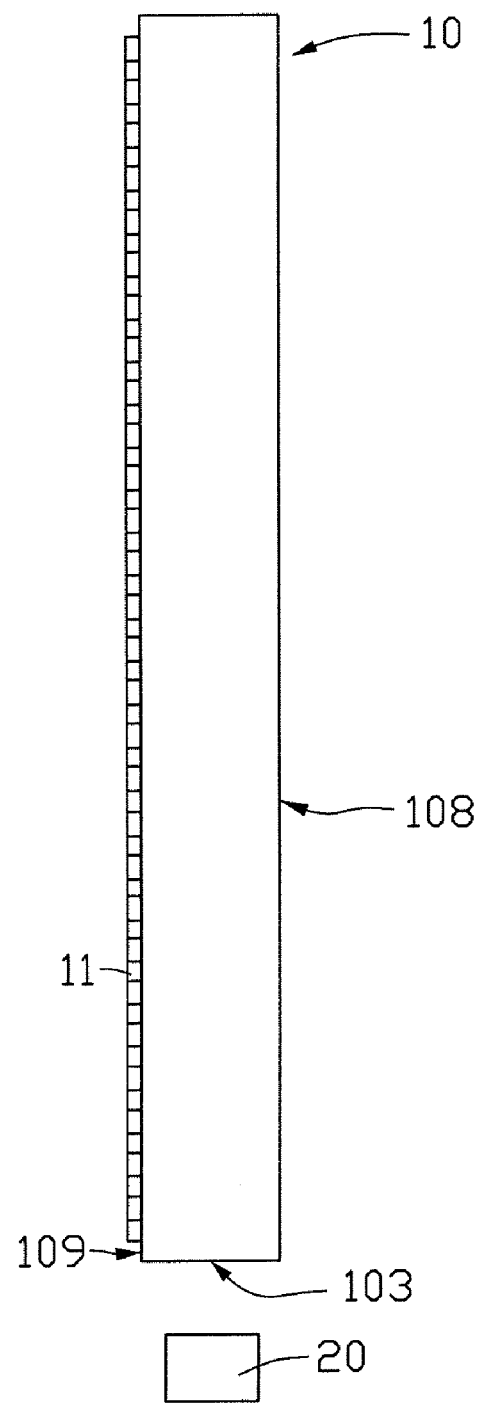
FIG. 2A is a schematic, side view of the light guide plate and the light source of FIG. 2.
Figure 3:
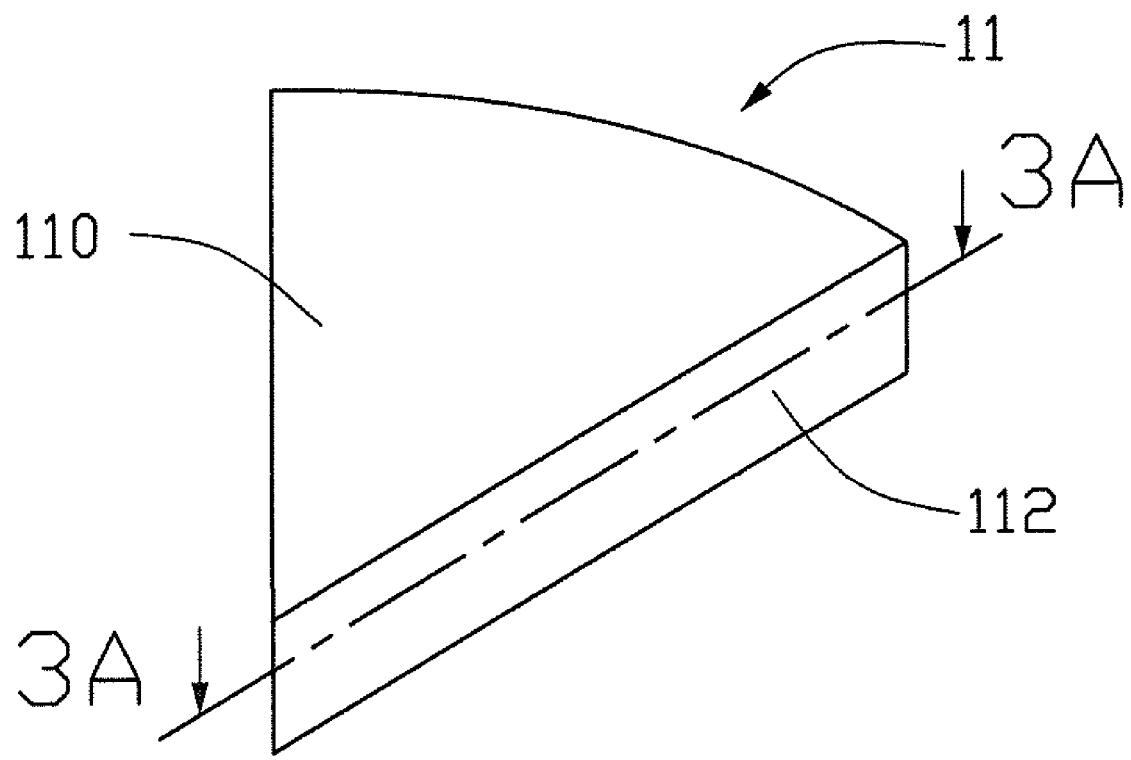
FIG. 3 is a schematic, perspective view of an alternative dot distribution on the light guide plate of FIG. 2.
Figure 3A:
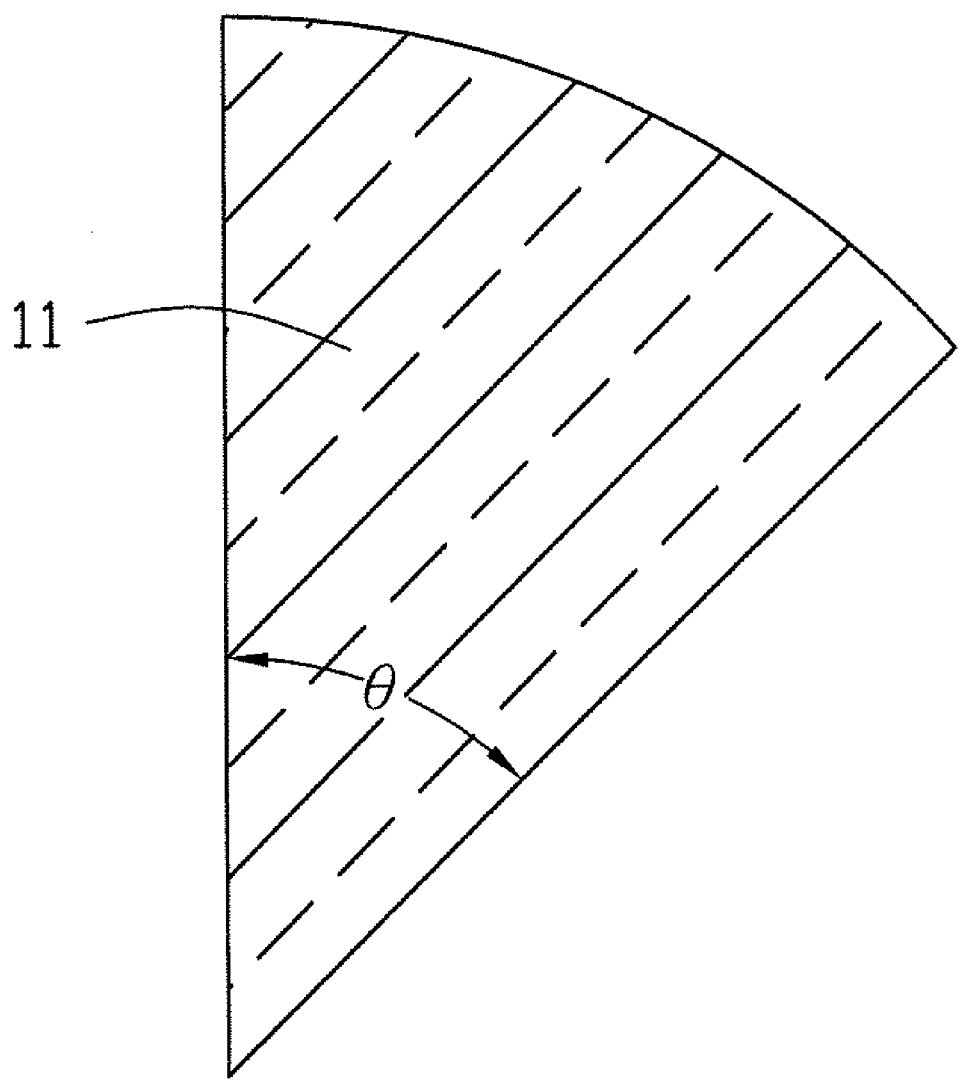
FIG. 3A is a cross section view of the dot taken along the line 3A-3A of FIG. 3.
Figure 4:
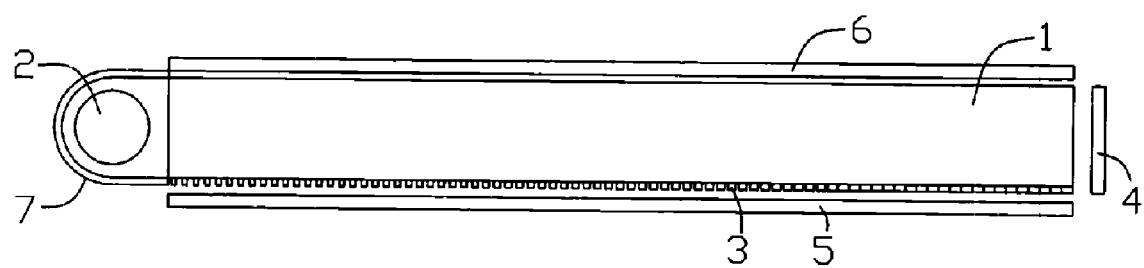
FIG. 4 is a schematic, side view of a conventional surface light source device.
Figure 5:
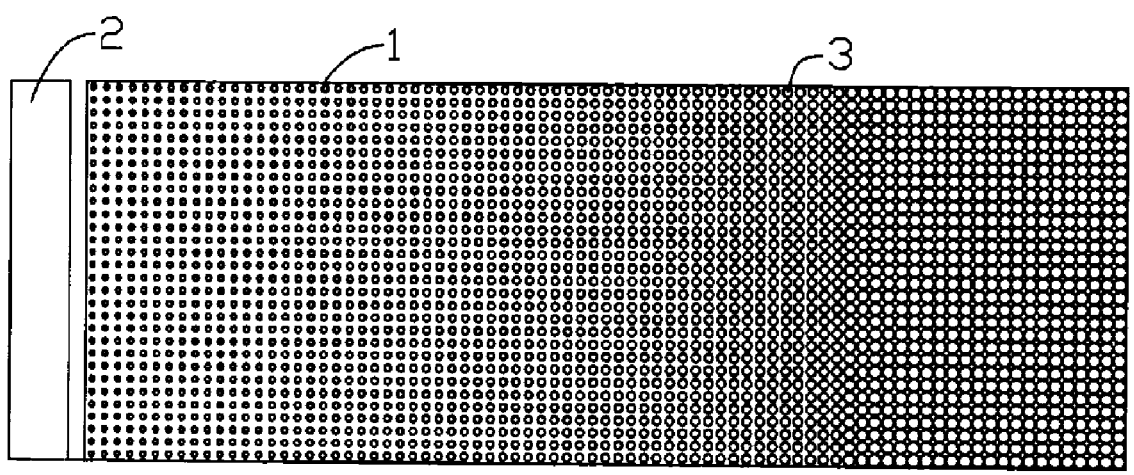
FIG. 5 is a schematic, bottom view of the surface source device of FIG. 4, showing a plurality of dots distributed on a bottom surface of a light guide plate thereof.

Referring to FIGS. 1-3, in general, and FIG. 1, in particular, a light guide plate 10 in accordance with a preferred embodiment of the present device is illustrated. The light guide plate 10 is a flat sheet having a uniform thickness. The light guide plate 10 includes a light incident surface 103, a light emission surface 108, a bottom surface 109 opposite to the light emission surface 108 and three side surfaces 101, 105 and 107. A light source 20 including a pair of lamps is located adjacent the incident surface 101 of the light guide plate 10.

The light guide plate 10 is made of a transparent material selected from the group consisting of acrylic resin, polycarbonate, polyethylene resin, and glass. The light incident surface 103 is for receiving incoming light beams emitted from the light source 20. The light emission surface 108 and the bottom surface 109 are parallel to each other and perpendicular to the light incident surface 103. The light emission surface 108 is for emitting light beams from the light guide plate 10. The three side surfaces 101, 105, 107 each have reflective films coated thereon. Three reflection plates 30 may be further provided and disposed adjacent the respective side surfaces 101, 105, 107. Alternatively, the reflection plates 30 could be optionally omitted due to the existence of the reflective films on the side surfaces 101, 105, 107 thereof. The reflection plates 30/reflective films are for reflecting the light beams back into the light guide plate 10.

Referring to FIGS. 2, 3, a plurality of dots (i.e. protrusions) 11 are distributed on the bottom surface 109 of the light guide plate 10 by means of a printing process or an injection molding process. The dots 11 each comprises a top surface 110 and side surfaces 112 connecting between the top surface 110 of the dots 11 and the bottom surface 109 of the light guide plate 10. Each of the side surfaces 112 is perpendicular to the bottom surface 109 of the light guide plate 10. Each dot 11 extends downwards from the bottom surface 109 of the light guide plate 10. Each dot 11 can essentially be in a form of a cylinder or a cone. In the preferred embodiment, the dots 11 are cylinders (i.e. cylindrical protrusions). The cross section in the direction parallel to the bottom surface 109 of each dot 11 is configured to be essentially an elliptical sector (i.e. elliptical fan-shaped) or a circular sector (i.e. circular fan-shaped). In the preferred embodiment, the cross sections of dots 11 are circular sectors. A distribution density of the dots 11 progressively increases along a direction away from the light source 20. In other words, the distribution density of the dots 11 near the light source 20 is smaller than the dots 11 far from the light source 20. An angle subtended by the cross-sectional sector (hereinafter, sector angle) of each of the dots 11 progressively increases along a direction away from the light source 20. In other words, the sector angle of each of the dots 11 near the light source 20 is smaller than that of the each of the dots 11 far from the light source 20. Therefore, the cross-sectional area of each of the dots 11 near the light source 20 is smaller than that of each of the dots far from the light source 20.

In the illustrated preferred embodiment, the dots 11 are distributed on the bottom surface 109 in rows and columns. The dots 11 are substantially equispaced in both a row direction and a column direction. The dots 11 are configured to be in a staggered pattern. It is to be understood that any fractional amount of offset could potentially be used, including varying the degree (fractional amount of width and/or length of the dot 11) of offset used between adjacent pairs of rows or columns on a given bottom surface 109, and still be within the scope of present system. In fact, it is recognized that varying the offset between adjacent pairs of rows or columns could potentially enhance the utilization ratio of the incident light beams and/or help avoid bright lines. Alternatively, each column of the dots 11 could have no offset and be within a same straight line.

In addition, the present light guide plate 10 can instead be wedge-shaped, and the dots 11 can be distributed, additionally or alternatively, on the light emission surface 108, using any of the various dot distributions as discussed previously. The light source 20 can, for example, be in the form of an incandescent or fluorescent lamp, a field emission device, a CRT (cathode ray tube), a LED (light emitting diode) or a plurality of LEDs. When the light source 20 is two LEDs set beside the light incident surface 103, a distribution density of the dots 11 progressively increases along a direction away from the LEDs. In other words, the distribution of the dots 11 near the LEDs is smaller than the dots 11 far from the LEDs. An angle subtended by the cross-sectional sector (hereinafter, sector angle) of each of the dots 11 progressively increases along a direction away from the LEDs. In other words, the sector angle of each of the dots 11 near the LEDs is smaller than that of the each of the dots 11 far from the LEDs. Therefore, the cross-sectional area of each of the dots 11 near the LEDs is smaller than that of each of the dots far from the LEDs. When the light source 20 is one linear lamp set beside the light incident surface 103, a distribution density of the dots 11 progressively increases along a direction away from the lamp. In other words, the distribution of the dots 11 near the lamp is smaller than the dots 11 far from the lamp. An angle subtended by the cross-sectional sector (hereinafter, sector angle) of each of the dots 11 progressively increases along a direction away from the lamp. In other words, the sector angle of each of the dots 11 near the lamp is smaller than that of the each of the dots 11 far from the lamp. Therefore, the cross-sectional area of each of the dots 11 near the lamp is smaller than that of each of the dots far from the lamp.

Furthermore, the light source 20 can, for example, be in the form of a pair of linear lamps or a pair of LEDs (light emitting diode) set beside the light incident surface 103 and the side surface 101 opposite to the light incident surface 103 (used as another light incident surface) respectively. A distribution state of the dots 11 at the bottom surface 109 is, advantageously, as follows: a distribution density of the dots 11 at a middle area of the bottom surface 109 is larger than that at other areas of the bottom surface 109, a sectional area of each dot 11 at the middle area is bigger than each dot 11 at the other areas, and an angle of the sector of the dots 11 at the middle area is smaller than that at other areas of the bottom surface 109.

Compared with a conventional light guide plate, each dot 11 of the present light guide plate 10 is substantially in the form of a sector (i.e. fan-shaped) with the sector angle of the sector gradually increasing with an increasing distance from the light source 20, and a distribution of the dots 11 is relatively compact (i.e. dense). Thus this compact configuration of the dots 11 ensures that the light guide plate 10 can disperse light beams in a preferable and effective manner. Furthermore, the sector structure can enhance the utilization ratio of the incident light beams thereby improving the whole uniformity of the emitted light beams.

Additionally, the distribution density of the dots 11 at the area far from the light source 20 is relatively large, and the dots 11 thereat each have a relatively large cross-sectional area. This configuration further ensures that the light guide plate 10 can effectively disperse light beams. Thus, the whole uniformity of the emitted light beams is further improved.

Therefore, the present light guide plate 10, incorporating all or some of the above-mentioned features, can be advantageously applied in back light systems of liquid crystal display devices.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guide plate comprising:
   a light incidence surface;
   a light emission surface adjoining the light incidence surface;
   a bottom surface adjoining the light incidence surface and opposite to the light emission surface; and
   a plurality of dots distributed on the bottom surface, the dots each bounded by a flat top surface parallel to the bottom surface, two radial surfaces and an arc surface wherein each dot has a sector shaped cross-section which is parallel to the bottom surface.

2. The light guide plate as claimed in claim 1, wherein the dots each comprising a top surface and side surfaces connecting between the top surface of the dots and the bottom surface of the light guide plate, the side surfaces each being perpendicular to the bottom surface of the light guide plate.

3. The light guide plate as claimed in claim 2, wherein the top surfaces of the dots are parallel to the bottom surface of the light guide plate.

4. The light guide plate as claimed in claim 2, wherein each dot extends downwards from the bottom surface of the light guide plate.

5. The light guide plate as claimed in claim 2, wherein the cross-section of each dot is configured to be one of an elliptical sector or a circular sector.

6. The light guide plate as claimed in claim 2, wherein a distribution density of the dots progressively increases along a direction away from a light source.

7. The light guide plate as claimed in claim 2, wherein a sector angle subtended by the sector-shaped cross-section of each of the dots progressively increases along a direction away from a light source.

8. The light guide plate as claimed in claim 2, wherein a sectional area of the cross-section of each of the dots progressively increases along a direction away from a light source.

9. The light guide plate as claimed in claim 2, wherein the dots are distributed on the bottom surface in rows and columns.

10. The light guide plate as claimed in claim 2, wherein the dots are substantially equispaced.

11. The light guide plate as claimed in claim 2, wherein the dots are arranged in a staggered pattern.

12. The light guide plate as claimed in claim 2, wherein the light guide plate is one of flat or wedge-shaped.

13. The light guide plate as claimed in claim 2, further comprising a plurality of dots distributed on the emission surface.

14. A backlight module comprising:
   At least one light source; and
   A light guide plate comprising a light incidence surface facing the at least one light source, a light emission surface adjoining the light incidence surface, the dots each bounded by a flat top surface parallel to the bottom surface of the light guide plate, two radial side surfaces and an arc surface wherein the radial side surfaces connect the top surface and the bottom surface of the light guide plate and are perpendicular to the bottom surface of the light guide plate wherein each dot has a sector-shaped cross-section which is parallel to the bottom surface.

15. The backlight module as claimed in claim 14, wherein each dot of the cross-section is configured to be one of an elliptical sector or a circular sector.

16. The backlight module as claimed in claim 14, wherein a distribution density of the dots progressively increases along a direction away from the at least one light source.

17. The backlight module as claimed in claim 14, wherein a sector angle subtended by the sector-shaped cross-section of each of the dots progressively increases along a direction away from the at least one light source.

18. The backlight module as claimed in claim 14, wherein a sectional area of the cross-section of each of the dots progressively increases along a direction away from a light source.

19. The backlight module as claimed in claim 14, wherein the dots are distributed on the bottom surface in rows and columns or in a staggered pattern.

20. The backlight module as claimed in claim 14, wherein the dots are substantially equispaced.

* * * * *